United States Patent Office 3,244,039
Patented Apr. 5, 1966

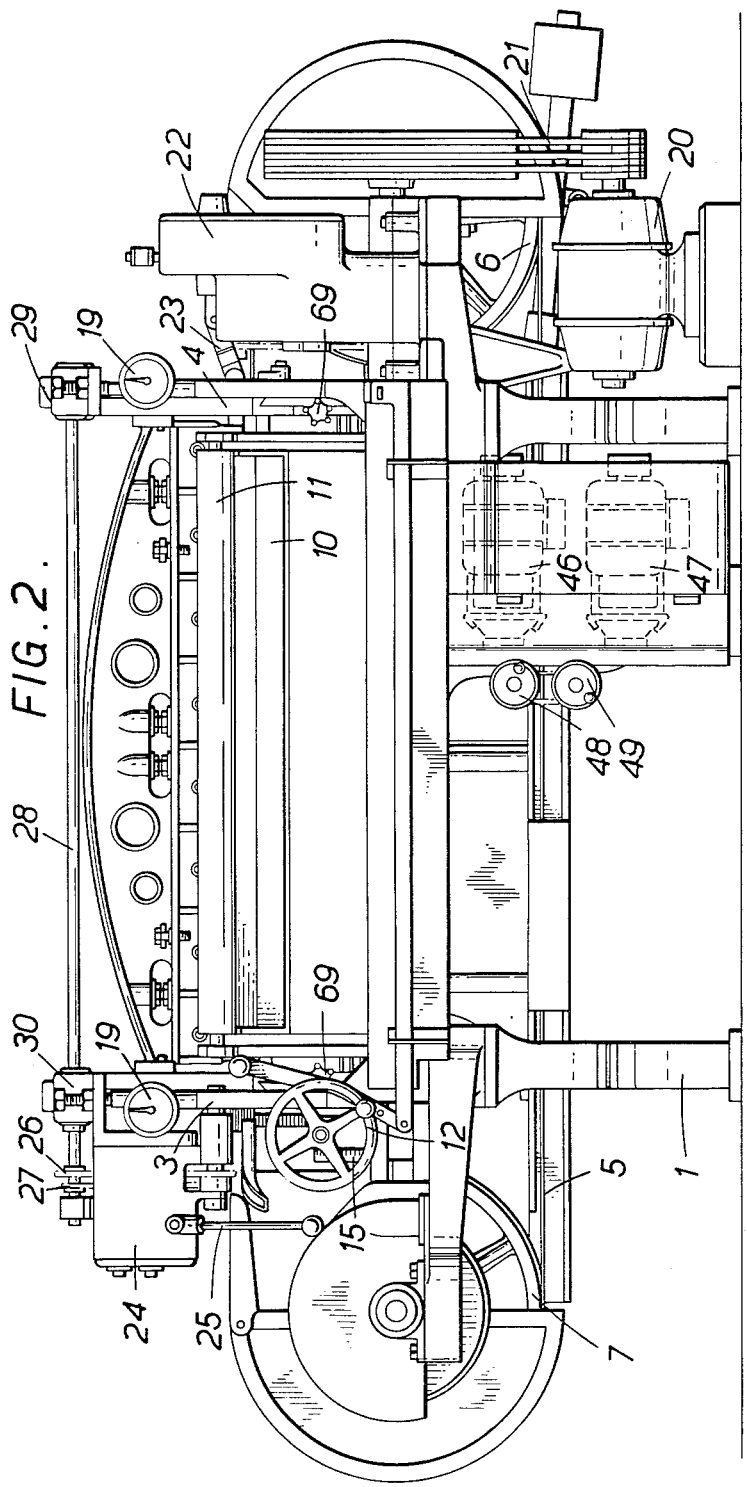

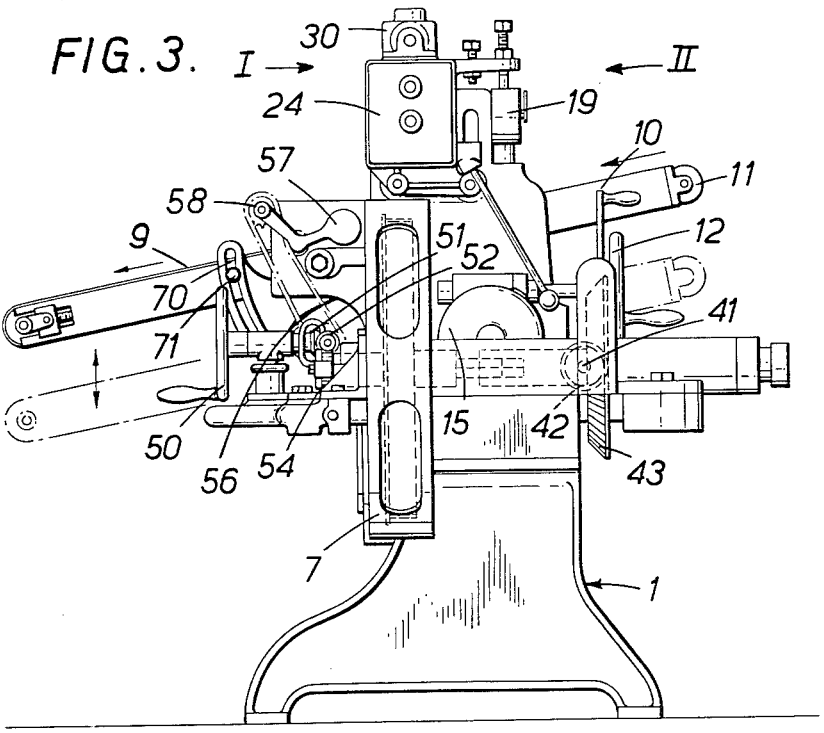
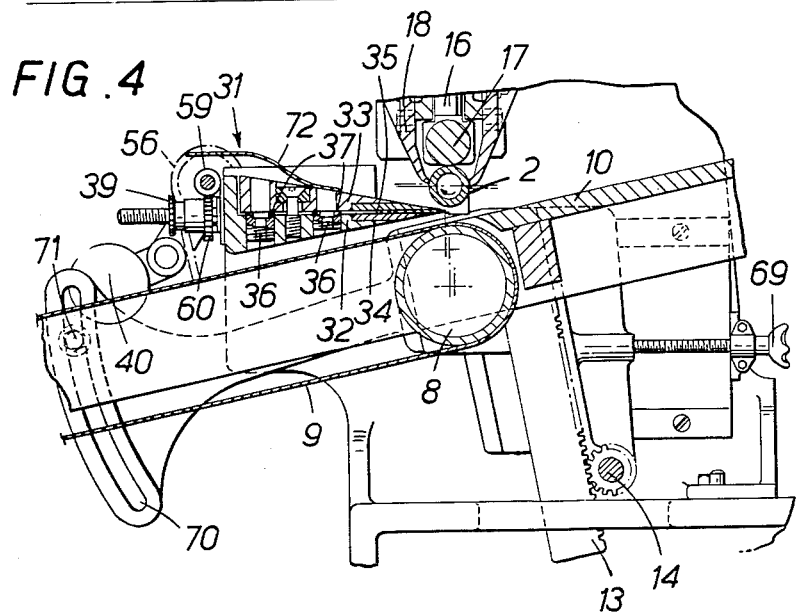

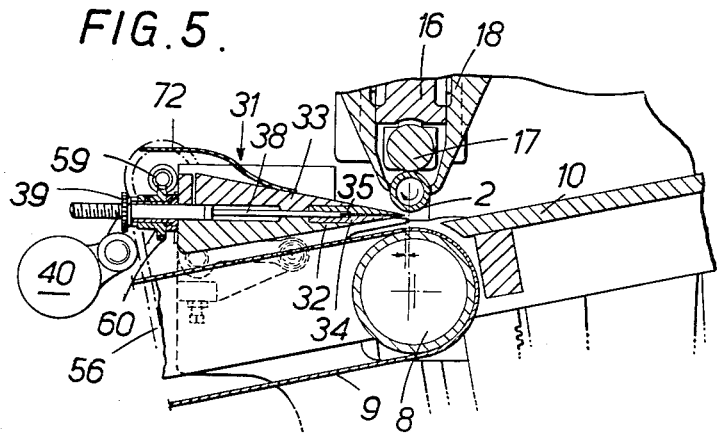
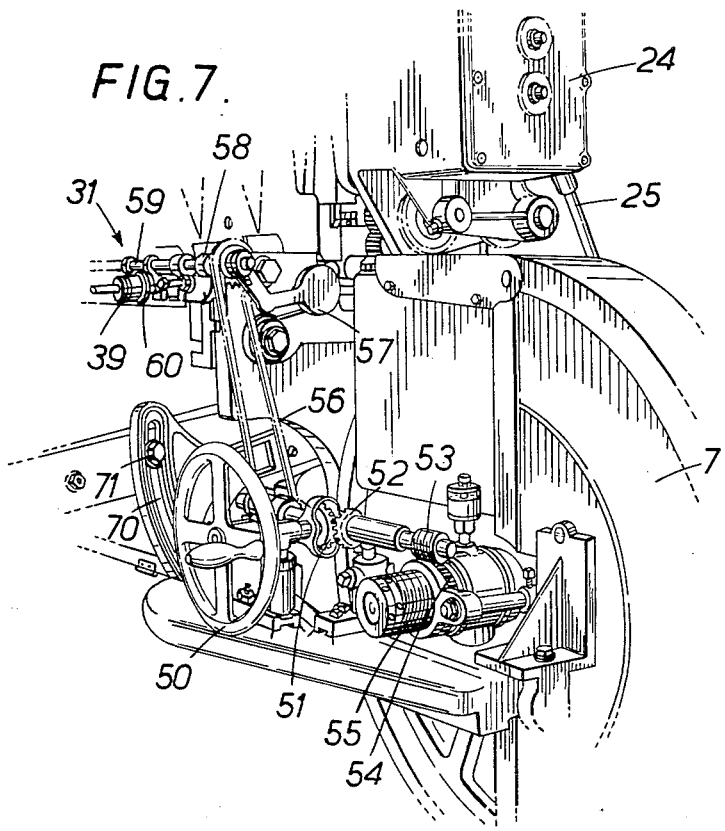

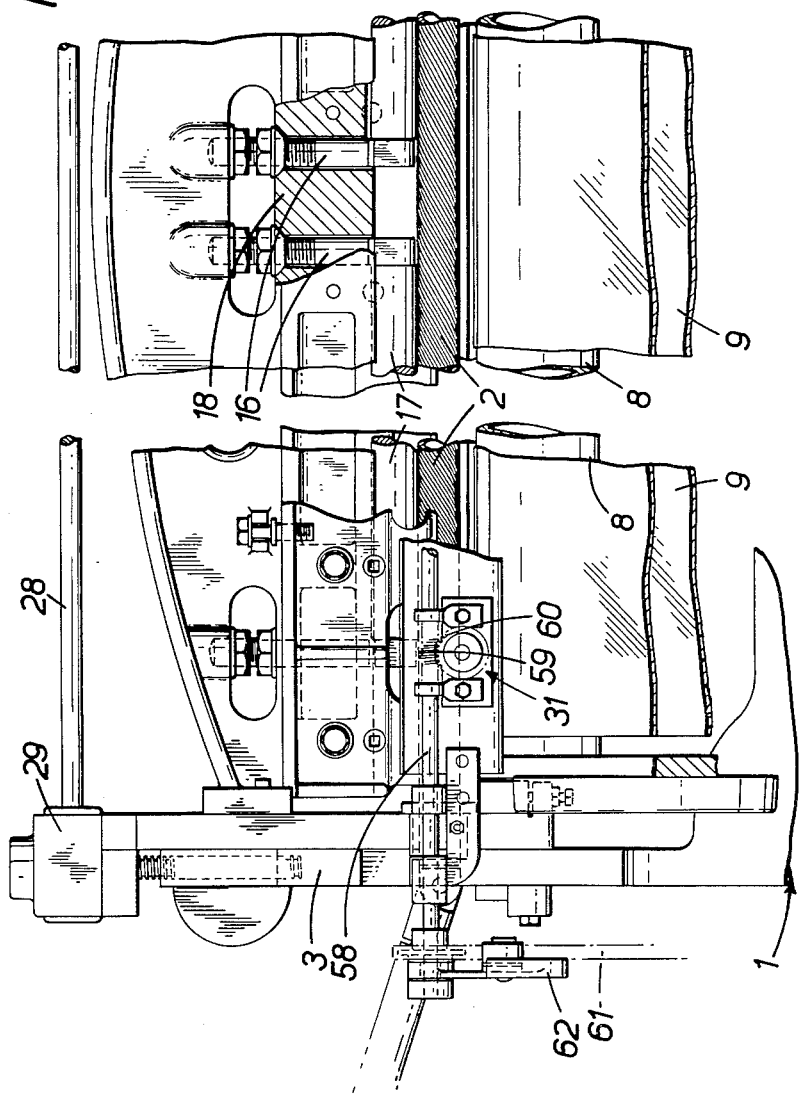

3,244,039
APPARATUS FOR CUTTING THIN SHEETS OF EXPANDED POLYSTYRENE OR THE LIKE
Ernest Crabb and Leslie Crabb, both of Poron Works, Gallows Park, Torpoint, Cornwall, England
Filed Aug. 24, 1961, Ser. No. 139,567
Claims priority, application Great Britain, Aug. 24, 1960, 29,317/60; Sept. 27, 1960, 33,107/60
2 Claims. (Cl. 83—4)

The invention relates to a method and apparatus for cutting thin sheets of expanded polystyrene or physically similar material from blocks or slabs to provide a product which is flexible and adapted for use as an insulator.

It is known to cut expanded polystyrene into sheets or slabs of a thickness which precludes any substantial bending of the cut sheet or slab, as for example by a saw or heated wire, but it has hitherto proved impossible to cut such material into sheets of an order of thickness of 2 mm. or less.

It is among the objects of the invention to provide a method and apparatus whereby expanded polystyrene or physically similar material may be cut into sheets of a thickness of the order of 2 mm. or less.

The thermal insulating properties of a sheet of expanded polystyrene 2 mm. thick are equivalent to 4½" of brickwork. The many advantages of such a thin sheet of material will be understood to those of ordinary skill in the art, a few of which are as follows: it can be bent around columns and pipes and over flat or uneven surfaces; it can be used to insulate existing buildings by direct application to plastered walls, ceilings or used as an underlay for floors; and it may readily be incorporated into laminations of thin sections of plywoods, plastics, or used to form inserts for packaging cartons and boxes. Further, polystyrene sheeting may be finished with substantially any type of applied material or decoration, paper, distemper, emulsion paint, cements or plasters, and many proprietary plastic finishings.

According to the invention, a method of cutting thin sheets of expanded polystyrene, or physically similar material, consists in feeding slabs or blocks of the material between rollers to bring the end face of the slab or block against a knife edge, advantageously an endless strip blade, while applying a compressive pressure to the material at or near the position of cutting, whereby a thin sheet of material of a thickness of the order of 2 mm. or less is peeled from the surface of the block.

According to the method of the invention furthermore, the compressive pressure is applied by frictional engagement between a pressure applying member such as a knurled roller, and the material to be cut, the movement of the material towards the knife edge being effected by rotation of the knurled roller.

According to the invention furthermore, apparatus for cutting thin sheets of expanded polystyrene or physically similar material from blocks or slabs includes means for applying a compressive pressure to the block or slab at or near the position of cutting.

Thus, apparatus for cutting sheets of an order of thickness of 2 mm. or less may, according to the invention, comprise a frame, a cutting blade mounted on knife carrying members mounted in the frame, a knurled roller mounted to be vertically adjustable in the frame with its axis in a vertical plane slightly in front of the cutting edge of the cutting blade, and a reaction roller mounted with the longitudinal axis in or near the vertical plane of the knurled roller, and between a feed-in table and a feed-out conveyor, in which the block or slab to be cut is held under pressure between the reaction roller and the knurled roller and is moved towards the cutting blade by rotation of the knurled roller.

It is a feature of the invention that the cutting is effected by an endless flexible blade moving transversely of the direction of movement of the moving block or slab and continuously ground to ensure a razor-like cutting edge. The blade is also caused to run through guide means to ensure that the blade maintains its horizontal alignment. Means may also be provided whereby the knife-carrying members and the knife can be moved together in a horizontal direction to compensate for the wearing down of the knife which may be caused by the continuous grinding operation.

The invention is diagrammatically illustrated by way of example in the accompanying drawings in which:

FIGURE 2 is a corresponding rear elevation;

FIGURE 3 is an end elevation;

FIGURE 4 is a part section on the line IV—IV of FIGURE 1 showing details of the knife guide means;

FIGURE 5 is a section of the line V—V of FIGURE 1 showing further details of the knife guide means;

FIGURE 6 is an enlarged front elevation of part of the apparatus and;

FIGURE 7 is a perspective view showing the knife feed adjustment mechanism.

Figure 1:
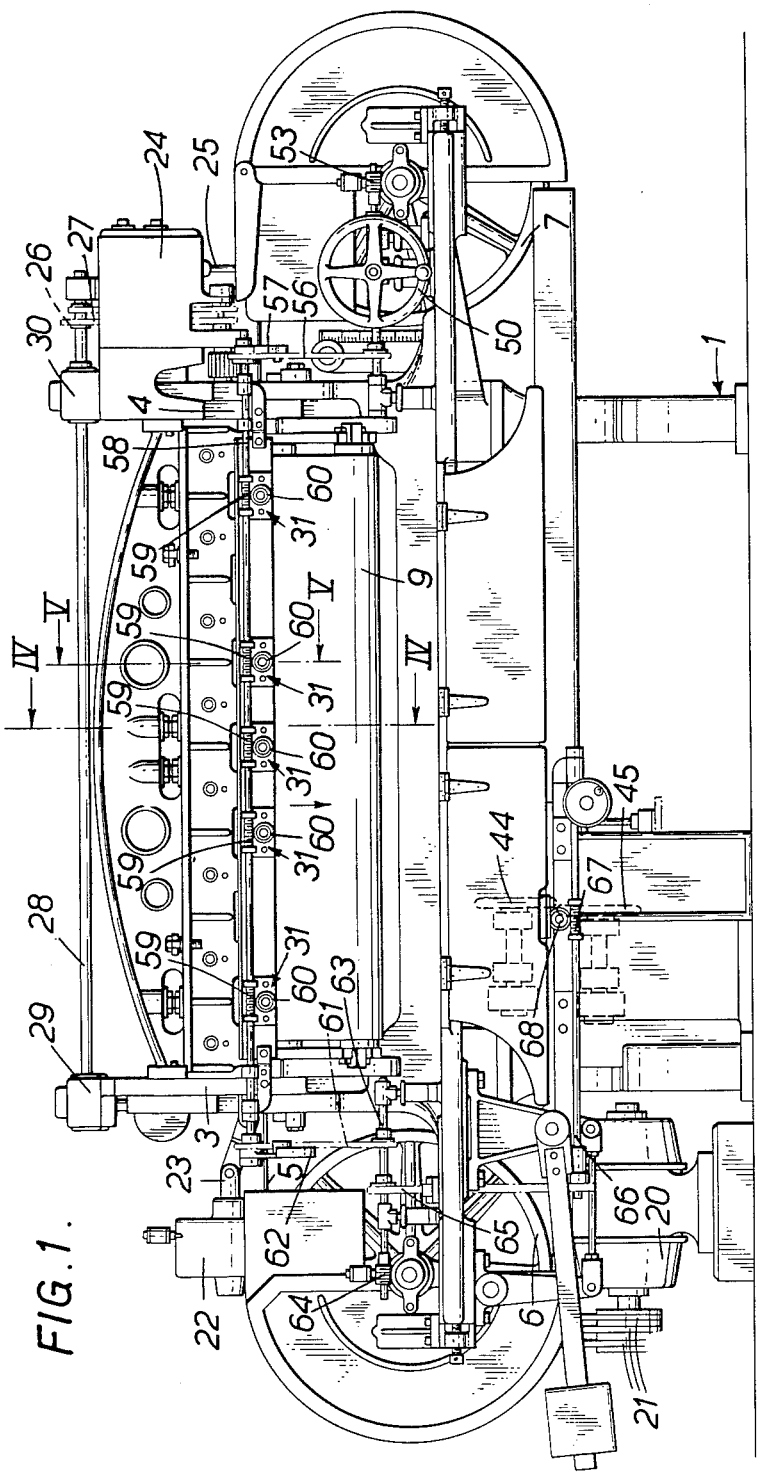
FIGURE 1 is a front elevation of apparatus constructed according to the invention.

In the drawings a machine is shown having a frame 1 and a knurled roller 2 (FIGURE 6) mounted between vertical frame members 3 and 4, to be vertically adjustable. The knurled roller 2 is mounted with its axis in a vertical plane slightly in front of the cutting edge of a knife 5 formed as an endless band and carried by wheel members 6, 7. A reaction roller 8 is mounted to be freely rotatable with its axis in or near the same vertical plane as the axis of the knurled roller 2 and carries a feed-out conveyor 9 forming, with a feed-in table 10, a single inclined plane. The feed-in table 10 is provided at that end furthest from the cutting position with a roller 11 to facilitate the placing of blocks or slabs to be cut on the feeding table 10.

The height of the feed-out conveyor 9 and the feed-in table 10 which are co-planar, is adjustable according to the thickness of the thin sheet required to be cut from the slab or block, and adjustment is effected by a hand wheel 12 through racks 13 and pinions 14 (FIGURE 4) the adjustment being indicated by a calibrated wheel 15. Alternatively, the adjustment could be effected automatically by electrical operating means.

Pressure is applied to the knurled roller 2 by threaded members 16 through rollers 17 provided to prevent bowing of the knurled roller 2 and mounted in guiding means 18. Pressure indicators 19 are provided one at each side of the frame 1 to give a measure of the pressure exerted by the knurled roller 2 on a block or slab of expanded polystyrene or similar material being fed between the rollers 2 and 8 from the feed-in table 10 so that, after each cut, the feed-in table may be readily adjusted to provide the same pressure again to ensure that each sheet is of the same thickness as the sheet previously cut.

The feed of the block on the feed-in table 10 is effected by rotation of the knurled roller 2, the thin sheet being peeled from the top of the block and the remainder of the block carried out on the feed out conveyor 9 by free rotation of the roller 8. The knurled roller 2 is driven by an electric motor 20 through V belts 21 and a two speed gear box 22 through universal gearing 23.

The feed is controlled by a clutch mechanism 24 through a hand lever 25. The initial adjustment of the machine is effected through chains 26, 27, shafts 28 one for each direction of motion and bevel gears at 29, 30.

The knife 5 is mounted to present a cutting edge in a horizontal plane and runs through several guide mechanisms or gauges indicated generally by 31 and shown in greater detail in FIGURES 4 and 5. The mechanisms 31 each comprise a lower jaw 32, an upper jaw 33 and members 34, 35 between which the blade passes. The lower jaw 32 of each of the mechanisms 31 is mounted above the conveyor 9 and levelling screws 36 with cup washers 37 are screwed into the lower jaw 32. The levelling screws are adjustable so that the members 34, 35 maintain the knife 5 in a horizontal cutting position. Positioning pins 38 are provided to be adjustable through thumb screws 39 so that the cutting edge of the knife 5 forms a straight line. A counterbalancing weight 40 is also provided as shown in FIGURES 4 and 5.

The upper jaws 33 advantageously slope slightly downwardly towards the cutting edge of the knife 5 so that the knife is held slightly more firmly nearer the cutting edge than at the other edge. To check the adjustment the knife 5 is pushed back into the jaws 32, 33 and the levelling screws 36 adjusted to ensure that the knife 5 just springs into its natural position without being pinched between the jaws.

The cutting movement of the knife 5 is effected by the electric motor 19 driving through shaft 41, pinions 42 mounted on the shaft 41 and bevel gears 43 the rotation of which causes rotation of the wheel members 6, 7 carrying the knife 5.

The knurled roller 2 and the endless band knife 5 may be electrically operated in synchronized, interrelated, timed relationship.

The knife 5 is continuously ground during the cutting action by grinders 44, 45 operated respectively by electric motors 46, 47 and adjustable respectively by means of hand wheels 48, 49.

It is necessary to maintain the cutting edge of the knife 5 in the same straight line throughout the cutting operations if thin sheets of uniform thickness are to be obtained, which necessitates moving the belt knife 5 forward slightly to compensate for the action of the grinders 44, 45.

This movement is effected by means of a hand wheel 50. Turning of the handwheel 50 turns the pinion 51 meshing with the pinion 52, thus turning the worm 53 and the pinion 54 mounted on the shaft of the wheel member 7 on which the knife 5 runs. The wheel 7 is moved slightly forward on the thread 55.

Movement of the hand wheel 50 also causes a chain 56 tensioned by a weight 57 to move and turn on a shaft 58 which is provided with worms 59 each meshing with a pinion 60 one of the pinions 60 being mounted on each guide means 31.

Rotation of the shaft 58 also causes movement of a chain 61 tensioned by a weight 62 and engaging with a pinion mounted on the other end of the shaft 58. The chain 61 effects movement of a shaft 63 carrying a worm 64 which is similar to the worm 53 and which causes movement of the wheel member 7 through similar gearing to that which effects movement of the wheel 6. A chain 65 is also caused to move by rotation of the shaft 53 and in turn to effect movement of a shaft 66 provided with a worm 67 meshing with a pinion 68 which effects movement of the knife 5 at a position near that of the grinders 44, 45.

Thus the whole knife carrying mechanism is moved horizontally to effect the required movement of the knife 5.

In operation the top beam of the machine is adjusted and a block of expanded polystyrene is fed from the feed-in table 10 between the knurled roller 2 and the reaction roller 8 and the pressure exerted on the block by the knurled roller 2 adjusted until the required thickness of the cut sheet is obtained.

Hand wheels 69 are provided for adjusting the position of the reaction roller 8. The arcuate slot 70 and the clamp 71 enable the inclination of the feed-in table 10 and the feed-out conveyor 9 to be varied. The thin sheet cut from the top of the block is guided clear of the apparatus by means of a bent plate 72.

When stopping the apparatus and before the knife comes to rest, the grinding wheels should be adjusted away from the knife to avoid grinding a notch into the knife.

When splitting material such as expanded polystyrene, it is generally unnecessary to use water but the knife jaws may be slightly lubricated by dripping a soap emulsion such as that used in a machining operation on the knife.

The knife can be used down to a width of 1½" to ⅜".

We claim:

1. Apparatus for cutting thin sheets having a maximum thickness of about 2 mm. from the top surface of a block of expanded, non-elastic, crushable, cellular material, such as expanded polystyrene, comprising: an in-feed table for conducting blocks of said material to a cutting station; a discharge conveyor for removing the uncut portion of said blocks from said cutting station; said in-feed table and said discharge conveyor being co-planar, whereby said blocks are maintained in a flat position as they pass through the cutting station; a pair of opposed rollers at said cutting station; means mounting said rollers with their central axes in vertical co-planar relationship; said pair of rollers including a driven upper knurled roller for frictionally engaging and positively feeding said blocks from said in-feed table to and through said cutting station to said discharge conveyor, and a cooperating, freely rotatable, rigid, lower reaction roller disposed between said table and said conveyor; means for applying a predetermined pressure to said upper knurled roller; means adjustably mounting said lower roller for providing a rigid reaction to said pressure, whereby a predetermined compressive force is applied to said block by said rollers at said cutting station; an endless band knife member; means movably mounting said knife for travel in a horizontal plane perpendicular to the plane of the central axes of said rollers and between the bight thereof, whereby the cutting operation is effected at the point of compression of said block of cellular material and at right angles thereto; guide means for maintaining said band knife fixed in said horizontal plane; means for continuously grinding the cutting edge of said band knife during the operation thereof; and means for simultaneously adjusting the disposition of said band knife and said guide means in said fixed horizontal plane relative to said rollers so as to maintain the cutting edge of said knife adjacent the bight of said rollers.

2. An apparatus as claimed in claim 1 including electrical operating means for said knurled roller, said endless band knife, said in-feed table, and said discharge conveyor, said electrical operating means actuating said knife, and said roller in synchronized relationship, and automatically adjusting the height of said table and said conveyor after each cutting operation by an amount equivalent to the thickness of the sheet cut from the block of said cellular material.

References Cited by the Examiner

UNITED STATES PATENTS 1,617,511    2/1927    Balch _____ 83—19
1,644,961   10/1927    Suttis et al. _____ 83—19

(Other references on following page)

UNITED STATES PATENTS

| | | | |
|---|---|---|---|
| 1,670,514 | 5/1928 | Lane | 83—19 |
| 1,844,820 | 2/1932 | Morey | 83—257 |
| 2,114,415 | 4/1938 | Campbell | 83—174 X |
| 2,221,716 | 11/1940 | Morton | 83—19 |
| 2,228,442 | 1/1941 | Coleman | 83—19 |
| 2,749,982 | 6/1956 | Hardt | 83—4 |
| 2,981,134 | 4/1961 | Johnson | 83—19 |
| 3,109,339 | 11/1963 | Braun et al. | 83—4 |

FOREIGN PATENTS

| | | |
|---|---|---|
| 530,412 | 7/1954 | Belgium. |
| 480,126 | 7/1929 | Germany. |
| 712,455 | 10/1941 | Germany. |
| 810,516 | 3/1959 | Great Britain. |
| 585,726 | 11/1958 | Italy. |

WILLIAM W. DYER, JR., *Primary Examiner.*

CARL W. TOMLIN, LEON PEAR, ANDREW R. JUHASZ, *Examiners.*